US009163641B2

(12) United States Patent
Tombers

(10) Patent No.: US 9,163,641 B2
(45) Date of Patent: Oct. 20, 2015

(54) TURBOCHARGER SUPPORT HOUSING HAVING IMPROVED DRAINAGE

(75) Inventor: Michael D. Tombers, Homer Glen, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 328 days.

(21) Appl. No.: 13/529,325

(22) Filed: Jun. 21, 2012

(65) Prior Publication Data

US 2013/0343929 A1    Dec. 26, 2013

(51) Int. Cl.
*F04D 29/42*      (2006.01)
*F01D 25/18*      (2006.01)
*F02C 6/12*       (2006.01)

(52) U.S. Cl.
CPC ............... *F04D 29/42* (2013.01); *F01D 25/18* (2013.01); *F02C 6/12* (2013.01); *F05D 2220/40* (2013.01); *F05D 2240/14* (2013.01)

(58) Field of Classification Search
CPC .......... F02C 6/12; F04D 29/42; F04D 29/403
USPC ................. 417/405–407, 409, 423.14, 390; 184/1.5, 6.2, 6.11, 6.12; 415/182.1, 415/110, 111, 175, 229
See application file for complete search history.

(56) References Cited

U.S. PATENT DOCUMENTS

| 3,667,214 | A | | 6/1972 | Addie |
| 4,719,818 | A | * | 1/1988 | McCreary ..................... 475/159 |
| 4,926,641 | A | | 5/1990 | Keller |
| 6,082,220 | A | * | 7/2000 | Kitagawa .................... 74/606 R |
| 6,237,720 | B1 | * | 5/2001 | Sutton .......................... 184/106 |
| 6,283,084 | B1 | * | 9/2001 | Nagai et al. ............... 123/196 R |
| 2010/0092319 | A1 | * | 4/2010 | Duppert ....................... 418/55.6 |
| 2012/0003081 | A1 | * | 1/2012 | Woollenweber ............. 415/180 |

FOREIGN PATENT DOCUMENTS

| WO | 2008042698 | 4/2008 |
| WO | 2010129404 | 11/2010 |
| WO | 2012027184 | 3/2012 |

* cited by examiner

*Primary Examiner* — Charles Freay
*Assistant Examiner* — Kenneth J Hansen
(74) *Attorney, Agent, or Firm* — Finnegan, Henderson, Farabow, Garrett & Dunner, LLP

(57) ABSTRACT

A support housing is disclosed for use with a turbocharger. The support housing may have an end wall, a semi-cylindrical protrusion extending from the end wall in a first direction, and a plurality of side walls extending from the end wall in a second direction. The plurality of side walls together with the end wall may form a generally hollow enclosure. The support housing may also include a mounting flange disposed at distal edges of the plurality of side walls, and a center opening disposed in the end wall. The support housing may further include a collection cavity formed at a gravitationally lowest corner of the end wall below the center opening and substantially isolated from the enclosure formed by the plurality of side walls and the end wall, and a gutter passage formed in the end wall and extending from the center opening to the collection cavity.

24 Claims, 5 Drawing Sheets

TURBOCHARGER SUPPORT HOUSING HAVING IMPROVED DRAINAGE

TECHNICAL FIELD

The present disclosure is directed to a turbocharger support housing and, more particularly, to a turbocharger support housing having improved drainage.

BACKGROUND

Internal combustion engines such as, for example, diesel engines, gasoline engines, and gaseous fuel powered engines are supplied with a mixture of air and fuel for subsequent combustion within the engines that generates a mechanical power output. In order to increase the power generated by this combustion process, each engine can be equipped with a turbocharged air induction system.

A turbocharged air induction system includes a turbocharger that uses exhaust from the engine to compress air flowing into the engine, thereby forcing more air into a combustion chamber of the engine than could otherwise be drawn into the combustion chamber. This increased supply of air allows for increased fueling, resulting in an increased power output. A turbocharged engine typically produces more power than the same engine without turbocharging.

A conventional turbocharger includes a compressor wheel centrally disposed within a housing and driven to rotate by a connected turbine wheel. The compressor wheel, turbine wheel, and an associated shaft that connects the two wheels together are supported with the housing by way of one or more bearings. During operation of the turbocharger, these bearings heat due to friction and must be cooled to maintained desired operation of the turbocharger. Cooling of the turbocharger bearings is generally accomplished by way of lubricating oil that is continuously supplied to the bearings.

During normal operation of the turbocharger, the lubricating oil drains under the force of gravity from the bearings down through a support housing and into a sump for recirculation to the bearings. However, in some situations, this natural draining can be hindered. For example, when the engine and connected turbocharger are tilted, some drain paths of the oil can be interrupted, causing oil to pool in undesired locations. The pooling oil, if left unchecked, could result in too little oil within the sump and, subsequently, an inadequate supply of oil to the bearings. In these situations, the bearings can overheat, causing damage to the turbocharger. Additionally or alternatively, the pooling oil, if in contact with rotating elements of the turbocharger (e.g., gears), could result in frothing of the oil, which can also be damaging to the bearings. Further, pooling oil, if in contact with seals, can cause the seals to become ineffective and leak, possibly increasing exhaust emissions or causing other problems.

The turbocharger support housing of the present disclosure addresses one or more of the problems set forth above and/or other problems of the prior art.

SUMMARY

In one aspect, the present disclosure is directed to a support housing for a turbocharger. The support housing may include an end wall, a protrusion extending from the end wall in a first direction and configured to receive the turbocharger, and a plurality of side walls extending from the end wall in a second direction opposite the first direction. The plurality of side walls together with the end wall may form a generally hollow enclosure. The support housing may also include a mounting flange disposed at distal edges of the plurality of side walls and configured to engage an engine, and a center opening disposed in the end wall and configured to receive a gear train of the turbocharger. The support housing may further include a collection cavity formed at a gravitationally lowest corner of the end wall below the center opening and substantially isolated from the enclosure formed by the plurality of side walls and the end wall, and a gutter passage formed in the end wall and extending from the center opening to the collection cavity.

In another aspect, the present disclosure is directed to another support housing for a turbocharger. This support housing may include an end wall, a protrusion extending from the end wall in a first direction and configured to receive the turbocharger, and a plurality of side walls extending from the end wall in a second direction opposite the first direction. The plurality of side walls together with the end wall may form a generally hollow enclosure. The support housing may also include a mounting flange disposed at distal edges of the plurality of side walls and configured to engage an engine, and a center opening disposed in the end wall and configured to receive a gear train of the turbocharger. The support housing may further include at least one collection trough formed within one of the plurality of side walls at a gravitationally lowest region of the enclosure.

In yet another aspect, the present disclosure is directed to a bearing housing for a turbocharger. The bearing housing may include a hollow, generally cylindrical body configured to receive a bearing of the turbocharger, and a mounting flange disposed at one end of the cylindrical body and configured to engage a support housing. The bearing housing may also include an inclined drain passage formed within the mounting flange at an assembled six o'clock position.

DETAILED DESCRIPTION

Figure 1:
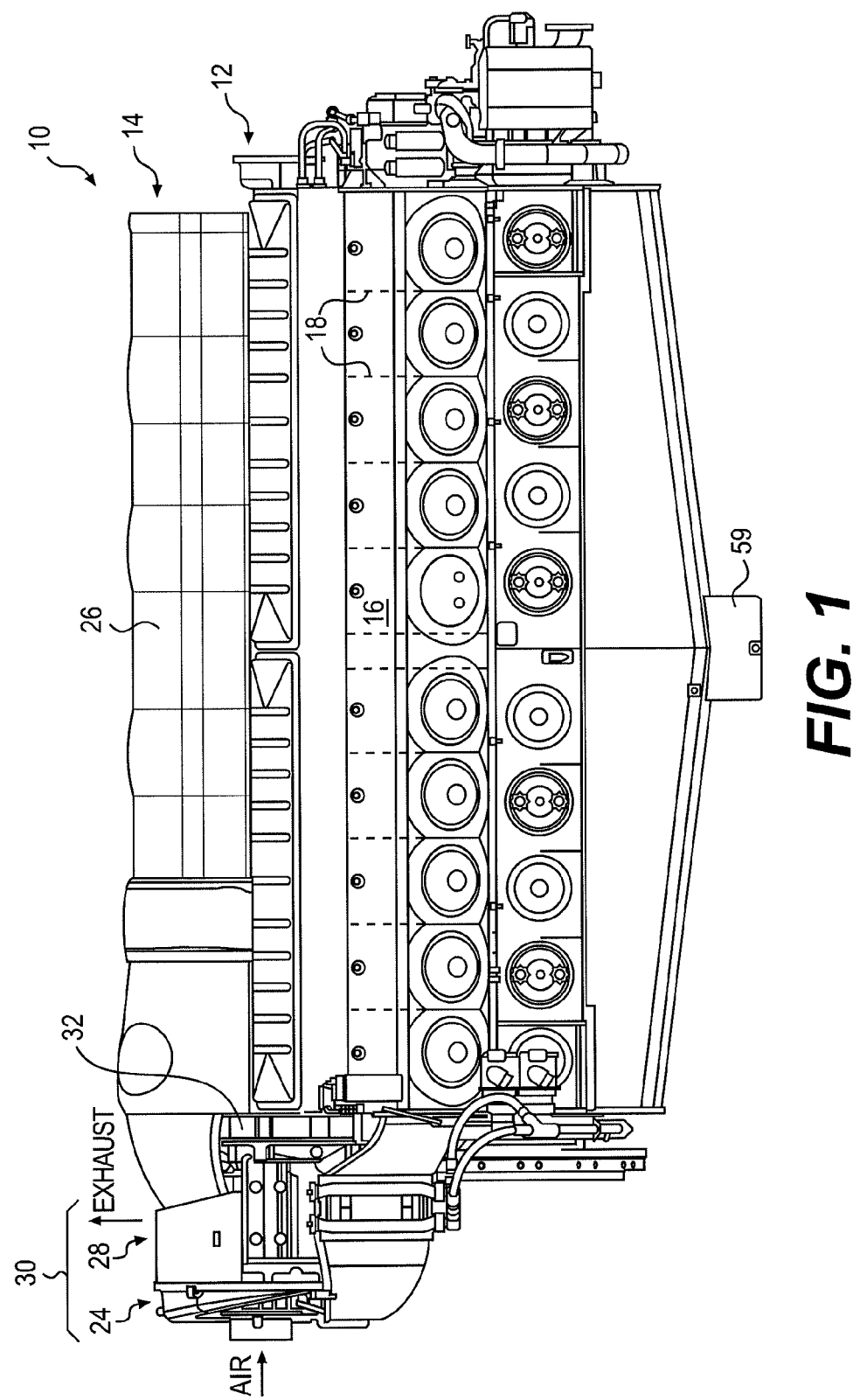
FIG. 1 is a pictorial illustration of an exemplary disclosed engine.

FIG. 1 illustrates an engine 10 equipped with an air induction system 12 and an exhaust system 14. For the purposes of this disclosure, engine 10 is depicted and described as a two-stroke diesel engine. One skilled in the art will recognize, however, that engine 10 may be another type of internal combustion engine such as, for example, a two- or four-stroke gasoline or gaseous fuel-powered engine. Engine 10 may include an engine block 16 that at least partially defines a plurality of cylinders 18. A piston (not shown) may be slidably disposed within each cylinder 18 to reciprocate between a top-dead-center position and a bottom-dead-center position, and a cylinder head (not shown) may be associated with each cylinder 18.

Cylinder 18, the piston, and the cylinder head may form a combustion chamber. In the illustrated embodiment, engine 10 includes twenty such combustion chambers arranged in two separate banks (only one shown in FIG. 1). However, it is contemplated that engine 10 may include a greater or lesser number of combustion chambers and that the combustion chambers may be disposed in an "in-line" configuration, in a "V" configuration, in an opposing-piston configuration, or in any other suitable configuration.

Air induction system 12 may include components configured to introduce charged air into the combustion chambers of engine 10. For example, air induction system 12 may include an induction manifold or plenum (not shown—located between the opposing banks of combustion chambers) fluidly connected along its length to the combustion chambers, one or more compressors 24 in fluid communication with an end of the induction manifold, and, in some embodiments, an air cooler (not shown) located downstream of compressors 24 and upstream of the combustion chambers. It is contemplated that additional components may be included within air induction system 12, if desired, such as valving, one or more air cleaners, one or more waste gates, a control system, a bypass circuit, and other means for introducing charged air into engine 10. It is also contemplated that the air cooler may be omitted, if desired.

Each compressor 24 of engine 10 may embody a fixed-geometry centrifugal-type compressor that is mechanically driven to compress air flowing into engine 10 to a predetermined pressure level. Compressors 24, if more than one is included within air induction system 12, may be disposed in a series or parallel relationship and fluidly connected to engine 10 via the induction manifold.

Exhaust system 14 may be configured to recuperate energy from the exhaust flowing out of the combustion chambers of engine 10. For example, exhaust system 14 may include an exhaust manifold 26 fluidly connected along its length to the combustion chambers of engine 10, and one or more turbines 28 in fluid communication with an end of exhaust manifold 26. Turbines 28, if more than one is included within exhaust system 14, may be connected in a series or parallel relationship.

Each turbine 28 of exhaust system 14 may be mechanically connected to one or more compressors 24 of air induction system 12 to form a turbocharger 30. Turbocharger 30 may be mounted to engine 10 by way of a support housing 32. As the hot exhaust gases exiting engine 10 move through exhaust manifold 26 into turbine 28 and expand against blades thereof, turbine 28 may rotate and drive the connected compressors 24 to compress inlet air directed to the combustion chambers of engine 10 via the induction manifold.

Figure 2:
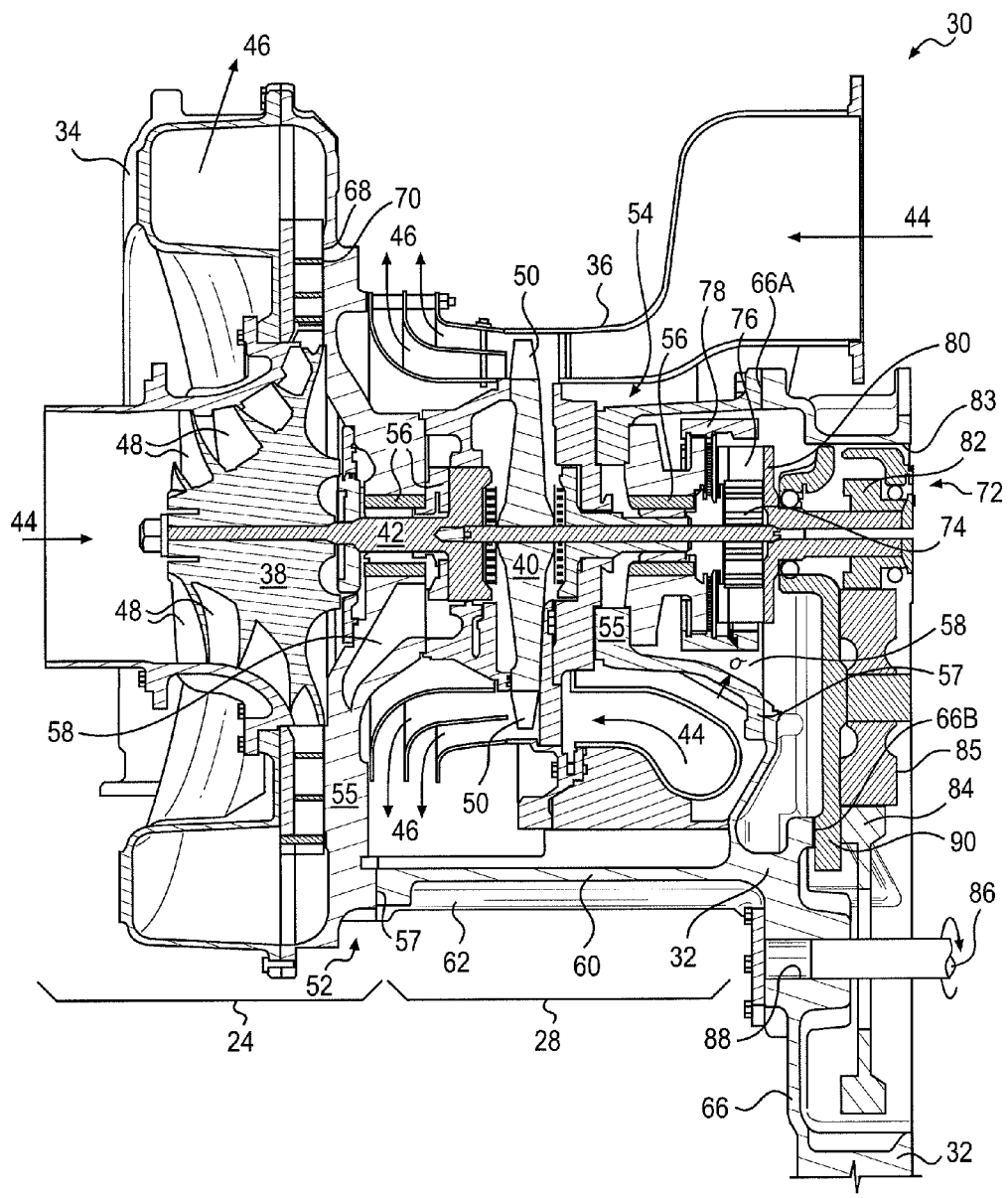
FIG. 2 is a cross-sectional illustration of an exemplary disclosed turbocharger that may be used in conjunction with the engine of FIG. 1.

As illustrated in FIG. 2, compressor 24 and turbine 28 may each include an associated shroud 34, 36 configured to house corresponding compressor and turbine wheels 38, 40 that are connected to each other via a common shaft 42. Each shroud 34, 36 may generally include an inlet 44 and an outlet 46. In the disclosed embodiment, inlets 44 are axially oriented and outlets 46 are radially oriented, although other configurations may also be possible. As compressor wheel 38 is rotated, air may be drawn axially in toward a center of compressor wheel 38. Blades 48 of compressor wheel 38 may then push the air radially outward in a spiraling fashion into the induction manifold (referring to FIG. 1). Similarly, as exhaust from exhaust manifold 26 is directed axially inward to turbine wheel 40, the exhaust may push against blades 50 of turbine wheel 40, causing turbine wheel 40 to rotate and drive compressor wheel 38 via shaft 42. After passing through turbine wheel 40, the exhaust may spiral radially outward through outlet 46. Compressor and turbine wheels 38, 40 may embody conventional wheels, with any number and configuration of blades 48, 50 radially disposed on a pressure face of corresponding wheel bases.

Each turbocharger 30 may include a bearing housing 52, 54 that connects compressor 24 and turbine 28 to support housing 32, respectively. Each of bearing housings 52, 54 may include a hollow, generally cylindrical body 55 having a mounting flange 57 located at one end that is configured to engage support housing 32. Cylindrical body 55 of bearing housings 52, 54 may be configured to support the corresponding compressor or turbine wheels 38, 40 at opposing ends of shaft 42 via one or more bearings 56, and provide passages 58 for lubricating oil to drain away from bearings 56 into support housing 32. After assembly to engine 10, passages 58 may be located at about a six o'clock position within the corresponding bearing housing 52, 54 (as seen from an axial end of bearing housings 52, 54), and be sloped downward at an angle θ. In the disclosed embodiment, θ may be an internal angle of about 30° relative to a center axis of cylindrical body 55. In the six o'clock position, passages 58 may be at the gravitationally lowest point possible within cylindrical body 55, which may allow for draining even when engine 10 is pitched forward or rearward by as much as about 30°. A mouth width W (referring to FIG. 3) of passages 58 may be wide enough and deep enough to allow oil to drain from bearing housings 52, 54 when engine 10 is rolled to the left or right during operation by as much as 30° (i.e., when cylindrical body 55 is rotated about its axis by as much as 30°.

The oil draining from bearing housings 52, 54 may pass through support housing 32, before returning to a sump 59 (shown only in FIG. 1) of engine 10. For example, the oil draining from bearing housing 52 may drain from passage 58 into a semi-cylindrical protrusion 60 that extends horizontally outward from support housing 32 and/or into one or more integral conduits 62 that pass through support housing 32 to sump 59 of engine 10. The oil draining from bearing housing 54 may pass through a generally horizontal end wall 66 of support housing 32 and drain to the sump of engine 10 via internal passages (not shown) in engine block 16, as will be described in more detail below.

Bearing housing 52 may be a generally cylindrical, multi-stepped component configured to engage an axial end of support housing 32 (i.e., an end of semi-cylindrical protrusion 60). Bearing housing 52 may be configured to internally support shaft 42 via bearings 56 at the compressor end, and support shroud 34 at an outer periphery. In fact, in the disclosed embodiment, bearing housing 52 cooperates with shroud 34 to form a scroll passage 68 that extends from inlet 44 to outlet 46. A diffuser 70 may be disposed within scroll passage 68.

Bearing housing 54 may also be a generally cylindrical, multi-stepped component. Bearing housing 54 may be configured to internally support shaft 42 at the turbine end via bearings 56, and engage an external surface 66A of end wall 66 at an outer periphery. Bearing housing 54 may also at least partially house and support a gear train 72. Gear train 72 may facilitate selective operation of turbocharger 30 in a turbocharging mode of operation (i.e., where turbine 28 drives compressor 24 in a conventional manner—described above) or in a supercharging mode of operation, where engine 10 drives compressor 24 via turbine 28. Supercharging may help eliminate lag normally associated with turbocharger operation at varying altitudes, thereby increasing both power and fuel efficiency.

Gear train 72 may be a planetary gear train. A planetary gear train is generally made up of at least three different elements, including a sun gear, a planet carrier having at least one set of planet gears, and a ring gear. The planet gears of the planet carrier mesh with the sun gear and the ring gear. One of the sun gear, planet carrier and ring gear is driven as an input, while another of the sun gear, planet carrier, and ring gear rotates as an output. The sun gear, planet carrier, planet gears, and ring gear can all rotate simultaneously to transmit power from the input to the output at a first ratio of speed-to-torque and in a forward direction or, alternatively, one of the sun gear, planet carrier, and ring gear can be selectively held stationary or locked to rotate with another gear and thereby transmit power from the input to the output at a second ratio of speed-to-torque and/or in a reverse direction. The change in rotational direction and/or speed-to-torque ratio of the planetary gear train depends upon the number of teeth in the sun and ring gears, the gear(s) that is selected as the input, the gear(s) that is selected as the output, and which gear, if any, is held stationary or rotationally locked with another gear. In some embodiments, a hydraulic clutch (also commonly referred to as a brake) is used to hold particular gears stationary and/or to lock the rotation of particular gears together.

In the disclosed embodiment, gear train 72 includes a sun gear 74 that is directly connected to an end of shaft 42 opposite compressor wheel 38, and a plurality of planet gears 76 that orbit and mesh with sun gear 74. Planet gears 76 may also mesh with a stationary ring gear 78 that is located radially outward of planet gears 76. A planet carrier 80 may extend from center axes of planet gears 76 and have formed on an external surface thereof a spur gear 82. Spur gear 82 may extend through a first center opening 83 in end wall 66 to mesh with an adjacent spur gear 84 (e.g., by way of one or more idler gears 85) that is fixedly supported on a shaft 86. Shaft 86 may extend through a second center opening 88 of support housing 32 to engage corresponding gears (not shown) within engine 10 that are connected to the crankshaft of engine 10. A bearing support 90 of gear train 72 may connect to end wall 66 of support housing 32 at an internal surface 66B opposite bearing housing 54. Passage 58 within bearing housing 54 may inhibit oil from pooling in the vicinity of gear train 72, thereby reducing a likelihood of gear train 72 frothing the oil.

Figure 3:
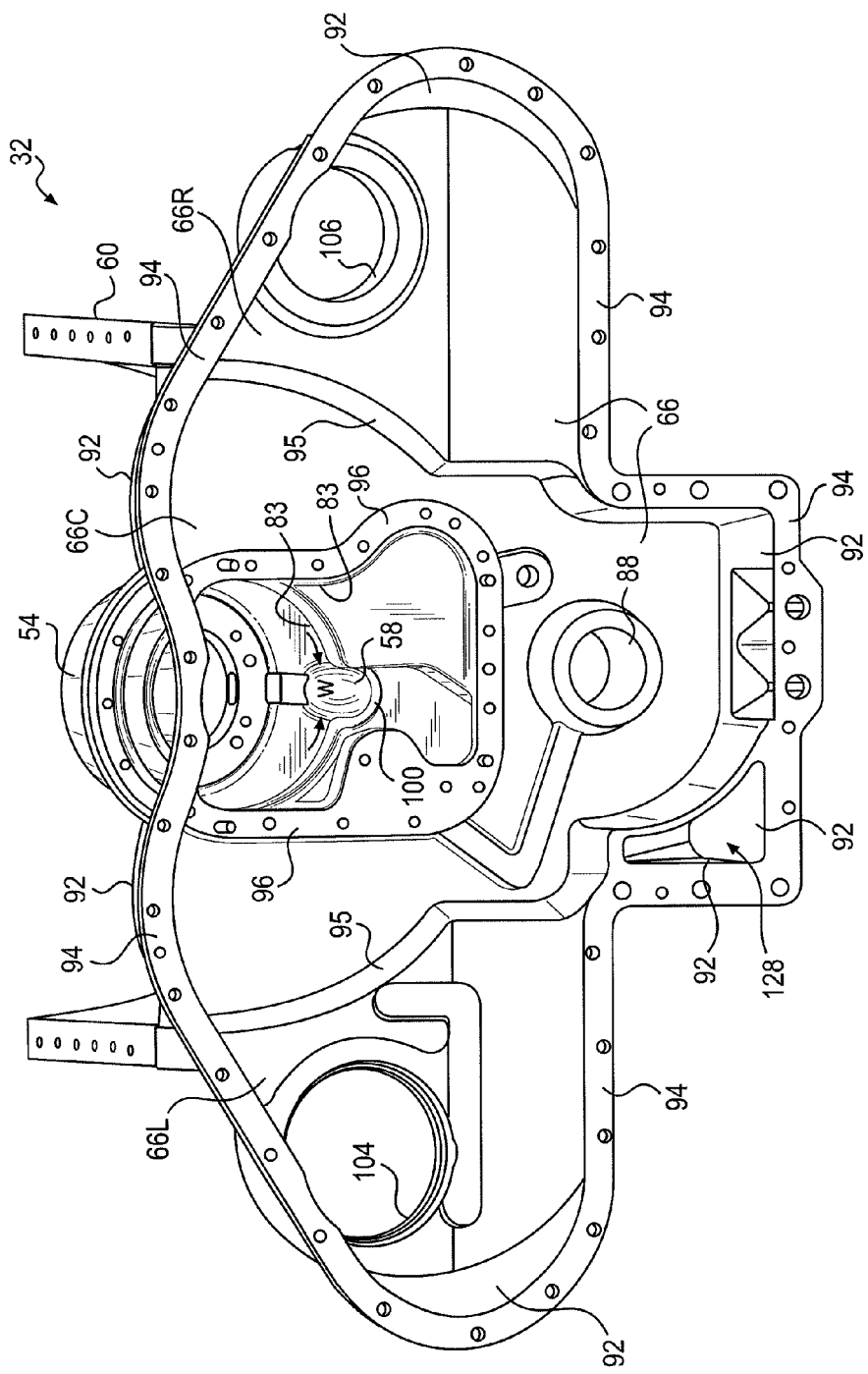
FIGS. 3-5 are pictorial illustrations of an exemplary disclosed turbocharger support housing that may be used in conjunction with the turbocharger of FIG. 2.

As shown in FIG. 3, support housing 32 may be a cast component configured to provide a means of connecting the remaining components of turbocharger 30 to engine 10. In particular, support housing 32 may include end wall 66, semi-cylindrical protrusion 60 protruding from external surface 66A of end wall 66, and a plurality of side walls 92 that at least partially surround end wall 66 and protrude from internal surface 66B of end wall 66 in a direction opposite semi-cylindrical protrusion 60. Side walls 92, together with end wall 66, may form a generally hollow enclosure. A mounting flange 94 may be disposed at distal edges of side walls 92 in a generally parallel orientation relative to end wall 66. Mounting flange 94 may be configured to engage an end of engine block 16. A plurality of fasteners (not shown) may pass through mounting flange 94 to connect support housing 32 with engine block 16.

End wall 66 of support housing 32 may be generally T-shaped, having a center portion 66C and left- and right-cross portions 66L, 66R, respectively. Support housing 32 may have a depth at center portion 66C that is greater than depths of left- and right-cross portions 66L, 66R. Accordingly, a step 95 may separate each of left- and right-cross portions 66L, 66R from center portion 66C. Substantially all of center portion 66C may be generally parallel to mounting flange 94, while a gravitationally lower area (with respect to an upright assembled orientation) of left- and right-cross portions 66L, 66R may be sloped toward mounting flange 94 to facilitate draining of these areas. A mounting flange 96 may be located radially inward of mounting flange 94 and protrude from center portion 66C to facilitate connection of bearing support 90 to support housing 32. In the disclosed embodiment, mounting flange 96 may be located closer to end wall 66 than mounting flange 94 (i.e., mounting flange 94 may have greater height), such that bearing support 90 may be contained within the enclosure formed by end wall 66 and side walls 92. One or more fasteners and/or dowel pins may pass through mounting flange 96 and be used to connect bearing support 90 to housing 32.

A plurality of openings may be formed within end wall 66. For example, central opening 83 may be disposed in an upper area of center portion 66C at bearing housing 54. Central opening 83 may be generally circular, but include a recess or notch 100 at about a six o'clock position to provide clearance for drain passage 58. Recess 100 may have a width about the same as mouth width W of drain passage 58 and actually form a portion of drain passage 58. Central opening 83 may provide clearance for gear train 72. In addition, center opening 88 may be disposed within a lower area of center portion 66C, below mounting flange 96. Center opening 88 may be generally circular and configured to receive shaft 86 of spur gear 84. Left and right openings 104, 106 may be disposed within left- and right-cross portions 66L, 66R, respectively. Left opening 104 may be configured to provide clearance for the shaft of an auxiliary component (e.g., an alternator, a pump, etc.—not shown) that is driven by engine 10. When the auxiliary component is not connected to support housing 32, left opening 104 may be closed off by way of a cover (not shown) that can be bolted to end wall 66. Right opening 106 may provide clearance and/or mounting for an oil separator (also known as a breather).

Figure 4:
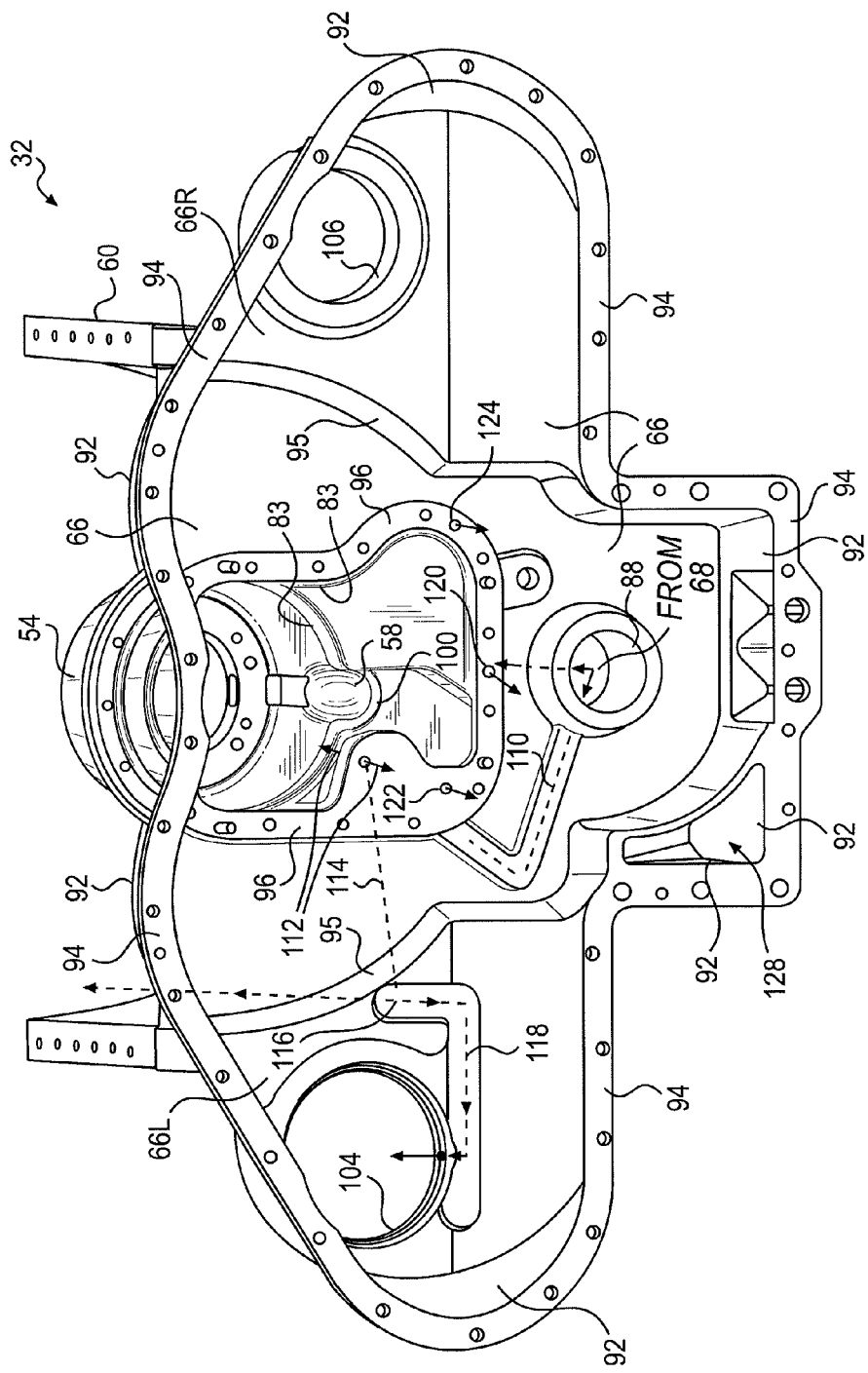

As shown in FIG. 4, support housing 32 may also provide flow paths for pressurized lubricating oil to the components of turbocharger 30. Specifically, a supply of pressurized oil may be provided from a high-pressure pump (not shown) driven by engine 10 to support housing 32 by way of shaft 86 (referring to FIG. 2). That is, the pressurized oil may be directed axially through shaft 86 to a plenum formed at the end of shaft 86. From this plenum, the oil may then be redirected radially outward a port (not shown) located at about a ten o'clock position within opening 88 and into a passage 110. Passage 110 may angle generally upward toward left opening 104 and make about a 90° turn to the right toward central opening 83 at a location about halfway between center opening 88 and left opening 104. Passage 110 may continue to a pair of outlet ports 112 located within mounting flange 96. Outlet ports 112 may be oriented in opposition to each other to spray in directions generally orthogonal to mounting flange 96. In this configuration, the lubricating oil sprayed from outlet ports 112 may function to lubricate gear train 72 and bearings 56 of turbine wheel 40 (referring to FIG. 2). A passage 114 may connect to passage 110 at outlet ports 112 and extend leftward toward left opening 104 to terminate at a junction point 116. From junction point 116, a passage 118 may direct pressurized oil downward and to the left to supply the oil to bearings (not shown) of the auxiliary device mounted at left opening 104. An additional conduit (external or internal—not shown) may connect to junction point 116 opposite passage 118 to supply pressurized oil to bearings 56 of compressor wheel 38 (referring to FIG. 2).

From the plenum located at the end of shaft 86, the pressurized oil may also be directed radially outward through a port (not shown) located at about a twelve o'clock position within opening 83. From this port, the pressurized oil may flow through a generally vertical passage (not shown) to a port 120 located within mounting flange 96. The oil may then spray outward and away from mounting flange 96 to lubricate idler gear 85 (referring to FIG. 2) through machined passages in an idler gear support (not shown).

Two additional discharge ports 122, 124 may be located within mounting flange 96 and configured to spray pressurized oil outward and away from mounting flange 96. The oil sprayed from ports 122, 124 may function to lubricate spur gear 84 (referring to FIG. 2). In the disclosed embodiment, dedicated inlet ports (not shown) and associated conduits (not shown) that are external to support housing 32 may be used to supply ports 122, 124 with pressurized oil. It is contemplated, however, that one or more of ports 122, 124 could alternatively be supplied with pressurized oil via groove 108 in center opening 88 and one or more internally formed passages, if desired.

Figure 5:
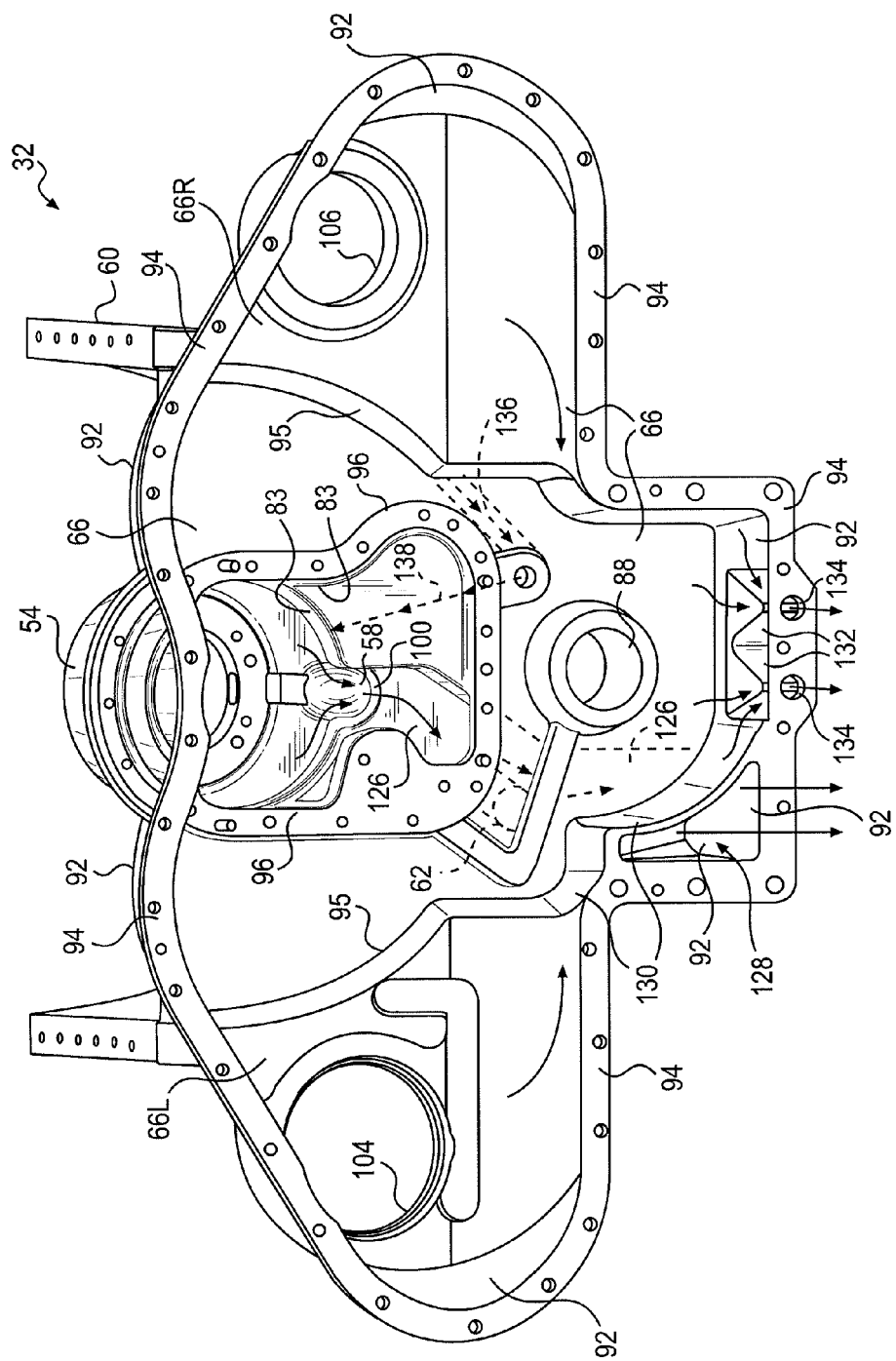

As shown in FIG. 5, support housing 32 may further provide drain paths for the lubricating oil of turbocharger 30 to reach sump 59 of engine 10. For example, an internal gutter passage 126 may be formed within support housing 32 that extends from passage 58 associated with bearing housing 54 into a collection cavity 128 located at a lower most corner of support housing center portion 66C (e.g., the lower-left corner shown in FIG. 5). Gutter passage 126 may function to direct all oil from within mounting flange 96 into collection cavity 128. This may include a majority of the lubricating oil draining from turbine bearings 56 and gear train 72. Conduit 62 (described above) may also fluidly connect with gutter passage 126 such that all lubricating oil draining from compressor bearings 56 also flows into collection cavity 128.

Collection cavity 128 may help to reduce an amount of lubricating oil in the vicinity of spur gear 84. In particular, spur gear 84 may be located in the lower-most region of support housing center portion 66C and, if not otherwise accommodated for, any lubricating oil pooling in this region could come into contact with spur gear 84 allowing spur gear 84 to froth the oil. Collection cavity 128 may be located in the lower-most corner of center portion 66C and be substantially isolated from the enclosure formed by end wall 66 and side walls 92. Collection cavity 128 may have geometry designed to keep the lubricating oil collected from bearings 56 and gear train 72 away from spur gear 84. That is, collection cavity 128 may have walls 130 that are extended from internal surface 66B to the face of mounting flange 94 such that the fluid collected by gutter passage 126 and delivered into collection cavity 128 may pass out of support housing 32 without having come into contact with spur gear 84.

One or more collection troughs or recesses 132 may be located within the lower-most region of support housing center portion 66C, at a position below spur gear 84. Collection troughs 132 may have a generally triangular cross-section, with sloped lower walls that extend from internal surface 66B to mounting flange 94. Walls 130 of collection cavity 128 may be generally curved toward collection troughs 132 to accommodate spur gear 84 and to facilitate draining of center portion 66C into collection troughs 132. Collection troughs 132 may be configured to collect oil draining from gear train 72 that was not collected within gutter passage 126. Although two collections troughs 132 are illustrated in FIG. 5, it is contemplated that any number of collection troughs 132 may be utilized, as desired. One or more drain ports 134 may be associated with collection troughs 132 and extend through mounting flange 94 and/or through end wall 66 to facilitate draining of collection troughs 132 into sump 59 of engine 10 (referring to FIG. 1). In this manner, the likelihood of pooling in the vicinity of spur gear 84 may be low.

Finally, support housing 32 may further provide one or more passages for compressed air to reach seals associated with turbine 28. For example, an external conduit 136 may be integrally formed with support housing 32 and extend from compressor 26 to center portion 66C in a direction substantially orthogonal to center portion 66C. External conduit 136 may fluidly communicate with an internal passage 138 at end wall 66 that leads to a periphery of bearing housing 54. Seals associated with turbine 28 may use this pressurized air to inhibit atomized oil from impinging turbine wheel 40.

INDUSTRIAL APPLICABILITY

The disclosed turbocharger support housing may be implemented into any power system application where tilting may be expected. In these applications, the disclosed turbocharger support housing may facilitate draining of oil from critical areas during the tilting, thereby enhancing operation and longevity of the power system.

For example, even when engine 10 pitches forward or rearward or rolls the right or left by as much as 30°, oil may still be able to drain from bearing housings 52, 54 through support housing 32 and into sump 59. Specifically, the location, size, and orientation of drain passages 58 may facilitate draining of bearing housings 52, 54 when engine 10 is tilted. In addition, the ability to collect this draining oil within cavity 128 and keep it substantially isolated from rotating components of turbocharger 30 (e.g., away from spur gear 84) may help to reduce the likelihood of oil frothing. Collection cavities 132 may further help to reduce pooling of oil in undesirable locations.

It will be apparent to those skilled in the art that various modifications and variations can be made to the disclosed support housing. Other embodiments will be apparent to those skilled in the art from consideration of the specification and practice of the disclosed support housing. For example, although not shown, it is contemplated that additional features may be provided in the disclosed support housing to facilitate manufacture and/or operation thereof. Specifically, one or more drill passages (not shown) may be included to facilitate tool access required to fabricate particular passages. It is intended that the specification and examples be considered as exemplary only, with a true scope being indicated by the following claims and their equivalents.

What is claimed is:

1. A support housing for a turbocharger, comprising:
   an end wall;
   a protrusion extending from the end wall in a first direction and configured to receive the turbocharger;
   a plurality of side walls extending from the end wall in a second direction opposite the first direction, the plurality of side walls together with the end wall forming a generally hollow enclosure;
   a first mounting flange disposed at distal edges of the plurality of side walls and configured to engage an engine;
   a center opening disposed in the end wall and configured to receive a gear train of the turbocharger;
   a collection cavity formed at a gravitationally lowest corner of the end wall below the center opening and substantially isolated from the enclosure formed by the plurality of side walls and the end wall;
   a gutter passage formed in the end wall and extending from the center opening to the collection cavity in the second direction; and
   a second mounting flange configured to engage a gear train bearing support, the second mounting flange disposed entirely around the center opening; and
   wherein an inlet of the gutter passage is located radially inward of the second mounting flange; and
   wherein:
   the center opening is an upper center opening;
   the support housing further includes a lower center opening configured accommodate a spur gear;

the inlet of the gutter passage is located between the upper and lower center openings; and the gutter passage angles to a side of the lower center opening.

2. The support housing of claim 1, wherein the collection cavity includes side walls that extend about the same distance from the end wall as the plurality of side walls.

3. The support housing of claim 1, further including at least one collection trough formed in a lower most wall of the plurality of side walls, within the enclosure.

4. The support housing of claim 3, wherein the at least one collection trough is located gravitationally below the center opening.

5. The support housing of claim 3, further including at least one drain port disposed within the mounting flange in fluid communication with the at least one collection trough.

6. The support housing of claim 5, wherein:
the at least one collection trough includes two collection troughs; and
the at least one drain port includes two separate drain ports in fluid communication with the two collection troughs.

7. The support housing of claim 3, wherein the at least one collection trough has a triangular cross-section with sloped lower walls.

8. The support housing of claim 3, wherein the collection cavity has a side wall that curves toward the at least one collection trough.

9. The support housing of claim 1, further including a notch located at a periphery of the central opening, the notch forming a portion of a drain passage in fluid communication with the gutter passage.

10. The support housing of claim 9, wherein the notch is located at an assembled six o'clock position.

11. The support housing of claim 10, wherein the notch has a width about the same as a mouth width of the drain passage.

12. The support housing of claim 1, further including an integral drain passage extending from a compressor portion of the turbocharger to the gutter passage.

13. The support housing of claim 12, further including an integral air supply passage extending from the compressor portion of the turbocharger to the central opening in the end wall.

14. The support housing of claim 1, wherein:
the end wall is generally T-shaped having a center portion, a left-side portion, and a right-side portion; and
lower regions of only the left- and right-side portions are sloped toward the first mounting flange.

15. The support housing of claim 1, further including a first oil supply passage extending from the lower center opening to at least one discharge port located in the second mounting flange.

16. The support housing of claim 15, wherein:
the at least one discharge port includes at least a first port; and
the support housing further includes:
at least a second discharge port disposed within the second mounting flange; and
a second oil supply passage extending from the lower center opening to the at least a second discharge port.

17. The support housing of claim 16, further including:
a side opening disposed within the end wall and configured to receive an auxiliary component; and
a third oil supply passage extending from the at least a first discharge port to the side opening.

18. The support housing of claim 17, further including a fourth oil supply passage extending from the third oil supply passage to a compressor portion of the turbocharger.

19. A support housing for a turbocharger, comprising:
an end wall;
a protrusion extending from the end wall in a first direction and configured to receive the turbocharger;
a plurality of side walls extending from the end wall in a second direction opposite the first direction, the plurality of side walls together with the end wall forming a generally hollow enclosure;
a first mounting flange disposed at distal edges of the plurality of side walls and configured to engage an engine;
a center opening disposed in the end wall and configured to receive a gear train of the turbocharger;
at least one collection trough formed within one of the plurality of side walls at a gravitationally lowest region of the enclosure;
a gutter passage formed in the end wall and extending from the center opening to the at last one collection trough in the second direction; and
a second mounting flange configured to engage a gear train bearing support, the second mounting flange disposed entirely around the center opening; and
wherein an inlet of the gutter passage is located radially inward of the second mounting flange; and
wherein:
the center opening is an upper center opening;
the support housing further includes a lower center opening configured accommodate a spur gear;
the inlet of the gutter passage is located between the upper and lower center openings; and
the gutter passage angles to a side of the lower center opening.

20. The support housing of claim 19, wherein the at least one collection trough is located gravitationally below the center opening.

21. The support housing of claim 20, further including at least one drain port disposed within at least one of the first mounting flange and the end wall in fluid communication with the at least one collection trough.

22. The support housing of claim 21, wherein:
the at least one collection trough includes two collection troughs; and
the at least one drain port includes two separate drain ports in fluid communication with the two collection troughs.

23. The support housing of claim 21, wherein the at least one collection trough has a triangular cross-section with sloped lower walls.

24. A turbocharger, comprising:
a housing at least partially defining a compressor shroud with a scroll inlet and a turbine shroud with a scroll outlet;
a turbine wheel disposed within the turbine shroud;
a compressor wheel disposed within the compressor shroud;
a shaft connecting the turbine wheel to the compressor wheel;
a compressor bearing housing configured to support a bearing at a compressor end of the shaft;
a turbine bearing housing configured to support a bearing at a turbine end of the shaft; and
a support housing configured to support the compressor and turbine bearing housings, the support housing including:
an end wall;
a semi-cylindrical protrusion extending from the end wall in a first direction to receive the compressor shroud and the turbine shroud;

a plurality of side walls extending from the end wall in a second direction opposite the first direction, the plurality of side walls together with the end wall forming a generally hollow enclosure;

a first mounting flange disposed at distal edges of the plurality of side walls and configured to engage an engine;

a center opening disposed in the end wall and configured to receive a gear train of the turbocharger;

a collection cavity formed at a gravitationally lowest corner of the end wall below the center opening and substantially isolated from the enclosure formed by the plurality of side walls and the end wall;

a gutter passage formed in the end wall and extending from the center opening to the collection cavity in the second direction;

at least one collection trough formed within one of the plurality of side walls at a gravitationally lowest region of the enclosure;

a drain port disposed within the mounting flange in fluid communication with the at least one collection trough; and a second mounting flange configured to engage a gear train bearing support, the second mounting flange disposed entirely around the center opening; and wherein an inlet of the gutter passage is located radially inward of the second mounting flange; and wherein:

the center opening is an upper center opening;

the support housing further includes a lower center opening configured accommodate a spur gear;

the inlet of the gutter passage is located between the upper and lower center openings; and the gutter passage angles to a side of the lower center opening.

* * * * *